(12) United States Patent
Zhang

(10) Patent No.: US 11,316,963 B2
(45) Date of Patent: Apr. 26, 2022

(54) CLAMPING DEVICE, AND HEAD-MOUNTED APPARATUS

(71) Applicant: GOERTEK INC., Shandong (CN)

(72) Inventor: Xing Zhang, Shandong (CN)

(73) Assignee: GOERTEK INC., Shandong (CN)

( * ) Notice: Subject to any disclaimer, the term of this patent is extended or adjusted under 35 U.S.C. 154(b) by 0 days.

(21) Appl. No.: 17/250,867

(22) PCT Filed: Dec. 21, 2018

(86) PCT No.: PCT/CN2018/122536
§ 371 (c)(1),
(2) Date: Mar. 15, 2021

(87) PCT Pub. No.: WO2020/062636
PCT Pub. Date: Apr. 2, 2020

(65) Prior Publication Data
US 2022/0046123 A1    Feb. 10, 2022

(30) Foreign Application Priority Data
Sep. 29, 2018   (CN) .......................... 201811149777.9

(51) Int. Cl.
*H04M 1/00*      (2006.01)
*H04B 1/38*      (2015.01)
(Continued)

(52) U.S. Cl.
CPC .......... *H04M 1/05* (2013.01); *E05B 73/0082* (2013.01); *H04B 1/3877* (2013.01)

(58) Field of Classification Search
CPC ......... B60R 11/0241; B60R 2011/0071; B60R 2011/0078; B60R 2011/0091; H04M 1/0264; H04M 1/04
(Continued)

(56) References Cited

U.S. PATENT DOCUMENTS 5,593,124 A * 1/1997 Wang .................. B60R 11/0241
248/231.81
5,659,612 A * 8/1997 Wang .................. B60R 11/0241
379/426

(Continued)

FOREIGN PATENT DOCUMENTS

CN        205902269 U    1/2017
CN        206387963 U    8/2017
(Continued)

*Primary Examiner* — Tan H Trinh
(74) *Attorney, Agent, or Firm* — LKGlobal | Lorenz & Kopf, LLP

(57) ABSTRACT

A clamping device includes a main sliding plate, a top sliding plate, a pair of clamping plates having a synchronizing bar, and a locking mechanism. The top sliding plate movably connected to the main sliding plate; the pair of clamping plates movably connected to the main sliding plate, the pair of clamping plates and the top sliding plate forming an accommodating space, one end of the synchronizing bar rotatably connected to a respective clamping plate, and the other end rotatably connected to the top sliding plate; the locking mechanism is located in a movement path of the top sliding plate. When the top sliding plate moves in a first direction, the top sliding plate drives the pair of clamping plates to clamp a clamped piece; and the top sliding plate drives the main sliding plate to move in the first direction.

13 Claims, 2 Drawing Sheets

(51) Int. Cl.
*H04B 1/3888* (2015.01)
*H04M 1/04* (2006.01)
*H04M 1/05* (2006.01)
*E05B 73/00* (2006.01)
*H04B 1/3877* (2015.01)

(58) Field of Classification Search
USPC .............. 455/90.3, 573, 575.1, 575.8, 575.9; 379/426, 446
See application file for complete search history.

(56) References Cited

U.S. PATENT DOCUMENTS

| | | | | |
|---|---|---|---|---|
| 6,888,940 | B1* | 5/2005 | Deppen | B60R 11/0241 379/446 |
| 9,749,002 | B1* | 8/2017 | Fan | H04B 1/3888 |
| 10,272,847 | B1* | 4/2019 | Fan | B60R 11/0241 |
| 10,598,199 | B1* | 3/2020 | Fan | B60R 11/02 |
| 2009/0186666 | A1* | 7/2009 | Bury | B60R 11/0241 455/573 |
| 2011/0233155 | A1* | 9/2011 | Hui | B60R 11/02 211/26 |
| 2018/0133594 | A1* | 5/2018 | Guo | A63F 13/245 |
| 2019/0001899 | A1* | 1/2019 | Cadalora | F16B 2/12 |

FOREIGN PATENT DOCUMENTS

| | | |
|---|---|---|
| CN | 207665025 U | 7/2018 |
| WO | 2017204523 A1 | 11/2017 |

* cited by examiner

CLAMPING DEVICE, AND HEAD-MOUNTED APPARATUS

CROSS-REFERENCE TO RELATED APPLICATION

This application is a U.S. National-Stage entry under 35 U.S.C. § 371 based on International Application No. PCT/CN2018/122536, filed Dec. 21, 2018 which was published under PCT Article 21(2) and which claims priority to Chinese Application No. 201811149777.9, filed Sep. 29, 2018, which are all hereby incorporated herein in their entirety by reference.

TECHNICAL FIELD

This application pertains to the technical field of head-mounted apparatus, and particularly relates to a clamping device and a head-mounted apparatus.

BACKGROUND

As VR (virtual reality) and AR (Augmented Reality) products are becoming popular, many VR/AR head-mounted apparatuses emerge in the market. One kind of the head-mounted apparatus uses a mobile phone as a main body for playing by inserting the mobile phone into the apparatus. In the conventional apparatuses, generally the mobile phone is secured with a holder in advance, and then the holder together with the mobile-phone is mounted into the head-mounted apparatus. However, the mode of securing a mobile phone with a holder is usually clamping and fixing the mobile phone by using a pulling piece, for example, clamping the mobile phone by using pulling pieces in an X direction and a Y direction. The pulling piece cannot ensure that the center of the mobile phone and the center of the head-mounted apparatus are completely aligned, which results in that, during watching, the user has the feeling of the deflection of the screen, which affects the experience. Moreover, the conventional mode of securing the mobile phone with a holder is usually restricted by the size of the holder, and cannot be suitable for various types of mobile phones. In addition, other objects, desirable features and characteristics will become apparent from the subsequent summary and detailed description, and the appended claims, taken in conjunction with the accompanying drawings and this background.

SUMMARY

In view of the above, the embodiments of the present application provide a clamping device and a head-mounted apparatus, which can ensure that the clamped piece is clamped at the central position of the clamping device while being suitable for many kinds of clamped pieces.

In order to solve the technical problems in the prior art, the embodiments of the present application provide a clamping device, wherein the clamping device comprises: a main sliding plate, a top sliding plate, at least one pair of clamping plates each of which has a synchronizing bar, and a locking mechanism;

the top sliding plate is movably connected to the main sliding plate;

the pair of clamping plates are movably connected to the main sliding plate, the pair of clamping plates and the top sliding plate form an accommodating space, one end of the synchronizing bar is rotatably connected to a respective clamping plates, and the other end is rotatably connected to the top sliding plate;

the locking mechanism is located in a movement path of the top sliding plate; and when the top sliding plate is moving in a first direction, the top sliding plate drives via the synchronizing bars the pair of clamping plates to move toward each other, whereby the pair of clamping plates clamp a clamped piece that is accommodated in the accommodating space; and simultaneously, the top sliding plate drives via the pair of clamping plates the main sliding plate to move in the first direction, whereby the top sliding plate is connected to the locking mechanism, and the locking mechanism locks a current position of the top sliding plate.

In some embodiments, the main sliding plate is provided with a first positioning block at each of positions that correspond to two opposite ends of the top sliding plate;

a first slideway that extends in a sliding direction of the top sliding plate is provided on a side of the first positioning block that faces the top sliding plate; and a first sliding rail that matches with the first slideway is provided at a position of the top sliding plate that corresponds to the first slideway, and the first sliding rail is reciprocatingly movable in a direction of extension of the first slideway.

In some embodiments, the top sliding plate comprises a first bottom plate and a first side plate that is provided on the first bottom plate;

the first bottom plate is rotatably connected to one end of each of the synchronizing bars; and the first sliding rails are provided at two opposite ends of the first bottom plate.

In some embodiments, the first bottom plate is provided with one rotation shaft, and the synchronizing bars located on different clamping plates are rotatably connected to the first bottom plate via the rotation shaft; or, the first bottom plate is provided with a plurality of rotation shafts, and the synchronizing bars located on the different clamping plates are rotatably connected to the first bottom plate via different rotation shafts.

In some embodiments, the main sliding plate is provided with second positioning blocks at positions that correspond to two opposite ends of each of the clamping plates;

a second slideway that extends in a sliding direction of a respective clamping plate is provided on a side of each of the second positioning blocks that faces the respective clamping plate; and a second sliding rail that matches with a respective second slideway is provided at a position of each of the clamping plates that correspond to the respective second slideway, and the second sliding rail is reciprocatingly movable in a direction of extension of the respective second slideway.

In some embodiments, each of the clamping plates comprises a second bottom plate and a second side plate that is provided on the second bottom plate;

the second bottom plate is rotatably connected to one end of the synchronizing bar; and the second sliding rails are provided at two opposite ends of the second bottom plate.

In some embodiments, the main sliding plate is provided with a first elastic member;

one end of the first elastic member is fixed, and the other end is connected to the main sliding plate;

when the main sliding plate is moving in the first direction, the first elastic member provides a restoring force to the main sliding plate; and once the locking mechanism releases the locking of the top sliding plate, by the restoring force of the first elastic member, the main sliding plate restores to an original position.

In some embodiments, the main sliding plate is provided with an accommodating groove that extends in a direction of movement of the main sliding plate, and the first elastic member is provided in the accommodating groove.

In some embodiments, each clamping plate of the pair of clamping plates is provided with a second elastic member; one end of the second elastic member is fixed to the main sliding plate, and the other end is connected to the clamping plate;

when the pair of clamping plates are moving toward each other, the second elastic member provides a restoring force to the clamping plate; and once the locking mechanism releases the locking of the top sliding plate, by the restoring force of the second elastic member, the pair of clamping plates move away from each other to original positions.

In some embodiments, the clamping device further comprises a fixing plate;

the main sliding plate is slidably provided on the fixing plate;

the locking mechanism is provided on the fixing plate; and the main sliding plate is provided with a stopper block, and the stopper block is located in a path where the main sliding plate moves in a direction opposite to the first direction, to limit a maximum distance of the movement of the main sliding plate.

In some embodiments, the fixing plate is provided with a third positioning block on a side facing the main sliding plate;

a third slideway that extends in a sliding direction of the main sliding plate is provided on a side of the third positioning blocks that faces the main sliding plate; and a third sliding rail that matches with the third slideway is provided at a position of the main sliding plate that corresponds to the third slideway, and the third sliding rail is reciprocatingly movable in a direction of extension of the third slideway.

In some embodiments, the locking mechanism comprises a locking rod and a third elastic member;

one end of the third elastic member is fixed, and the other end is connected to the locking rod; and the locking rod is provided with a first clip part at one end, and a second clip part that matches with the first clip part is provided at a position of the top sliding plate that corresponds to the first clip part.

Correspondingly, the embodiments of the present application further provide a head-mounted apparatus, comprising the clamping device stated above.

In the technical solutions according to the embodiments of the present application, when the top sliding plate is moving, it can drive via the synchronizing bars the pair of clamping plates to move toward each other, so that the pair of clamping plates can clamp the clamped piece, which can be suitable for various clamped pieces, to enable the pair of clamping plates to clamp the clamped piece that is accommodated in the accommodating space. Furthermore, simultaneously when the pair of clamping plates are synchronously moving, the top sliding plate drives the main sliding plate via the pair of clamping plates, to ensure that the clamped piece is clamped at the central position of the clamping device. The clamping process is simple and quick, and the usage is humanized, which improves the usage experience of the user.

BRIEF DESCRIPTION OF THE DRAWINGS

The present invention will hereinafter be described in conjunction with the following drawing figures, wherein like numerals denote like elements, and.

DESCRIPTION OF THE REFERENCE NUMBERS

10: main sliding plate; 11: first positioning blocks; 12: first slideways; 13: second positioning blocks; 14: second slideways; 15: first elastic member; 16: accommodating groove; 17: third sliding rails;

20: top sliding plate; 21: first sliding rails; 22: first bottom plate; 23: first side plate; 24: rotation shaft; 25: second clip part;

30: clamping plates; 31: synchronizing bars; 32: second bottom plates; 33: second side plates; 34: second elastic members;

40: locking mechanism; 41: locking rod; 42: third elastic member; 43: first clip part;

50: fixing plate; 51: stopper blocks; 52: third positioning blocks; and 53: third slideways.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions of the embodiments of the present application will be described below with reference to the drawings of the embodiments of the present application. Apparently, the described embodiments are merely certain embodiments of the present application, rather than all of the embodiments. All of the other embodiments that a person skilled in the art can obtain on the basis of the embodiments of the present application without paying creative work will fall within the protection scope of the present application.

The inventor has found when making the present application that, currently, the conventional mode of securing a mobile phone with a holder is usually clamping and fixing the mobile phone by using a pulling piece, which cannot ensure that the center of the mobile phone and the center of the head-mounted apparatus are completely aligned. Furthermore, the conventional mode of securing a mobile phone with a holder is usually restricted by the size of the holder, and cannot be suitable for many kinds of mobile phones.

Therefore, in order to overcome the defects in the prior art, the embodiments of the present application provide a clamping device and a head-mounted apparatus, which can ensure that the clamped piece is clamped at the central position of the clamping device while being suitable for many kinds of clamped pieces.

The implementation of the present application will be described in detail below with reference to the drawings and embodiments, thereby understanding sufficiently how the embodiments of the present application apply the technical means to solve the technical problems and achieve the technical effects and implementing the present application accordingly. The structure of the present application will be further described below with reference to the accompanying drawings.

The First Embodiment

Figure 1:
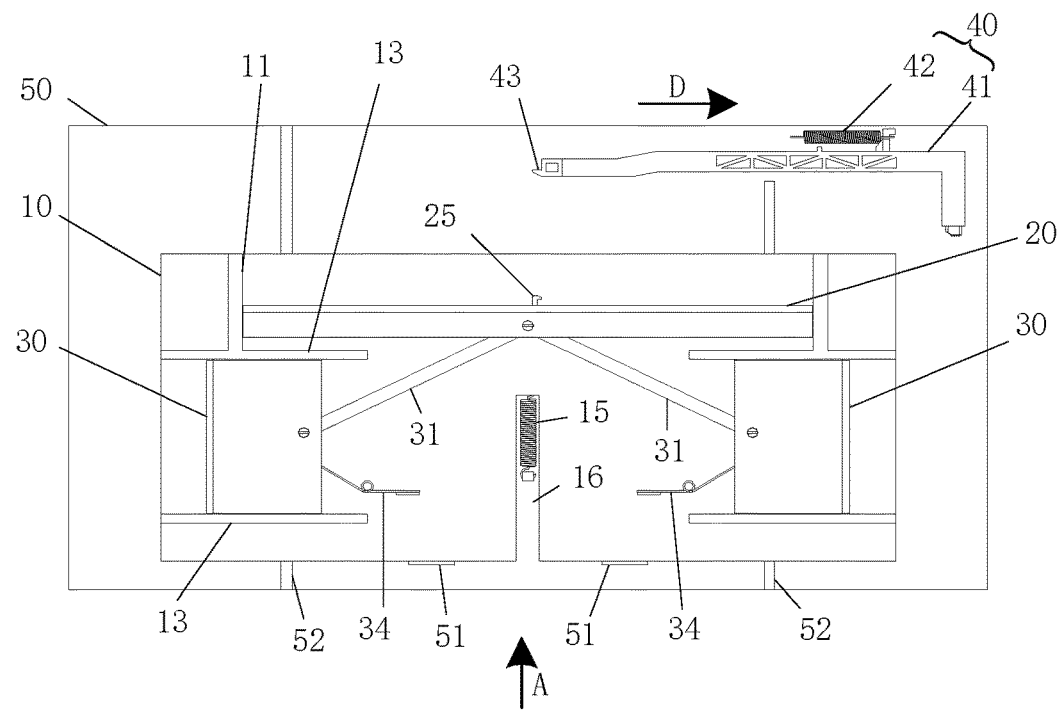
FIG. 1 is a schematic planar structural diagram of the clamping device according to an embodiment of the present application.

FIG. 1 is a schematic planar structural diagram of the clamping device according to an embodiment of the present application.

The embodiment of the present application provides a clamping device, comprising a main sliding plate 10, a top sliding plate 20, at least one pair of clamping plates 30 each of which has a synchronizing bar 31, and a locking mechanism 40.

The top sliding plate 20 is movably connected to the main sliding plate 10. The pair of clamping plates 30 are movably connected to the main sliding plate 10, the pair of clamping plates 30 and the top sliding plate 20 form an accommodating space, one end of the synchronizing bar 31 is rotatably connected to a respective clamping plates 30, and the other end is rotatably connected to the top sliding plate 20. The locking mechanism 40 is located in the movement path of the top sliding plate 20.

When the top sliding plate 20 is moving in a first direction, the top sliding plate 20 drives via the synchronizing bars 31 the pair of clamping plates 30 to move toward each other, whereby the pair of clamping plates 30 clamp a clamped piece that is accommodated in the accommodating space; and simultaneously, the top sliding plate 20 drives via the pair of clamping plates 30 the main sliding plate 10 to move in the first direction, whereby the top sliding plate 20 is connected to the locking mechanism 40, and the locking mechanism 40 locks a current position of the top sliding plate 20.

In the technical solution according to the embodiment of the present application, when the top sliding plate 20 is moving, it can drive via the synchronizing bars 31 the pair of clamping plates 30 to move toward each other, so that the pair of clamping plates 30 can clamp the clamped piece, which can be suitable for many kinds of clamped pieces, whereby the pair of clamping plates 30 clamp a clamped piece that is accommodated in the accommodating space. Furthermore, simultaneously when the pair of clamping plates 30 are synchronously moving, the top sliding plate 20 drives the main sliding plate 10 via the pair of clamping plates 30, to ensure that the clamped piece is clamped at the central position of the clamping device. The clamping process is simple and quick, and the usage is humanized, which improves the usage experience of the user.

Figure 2:
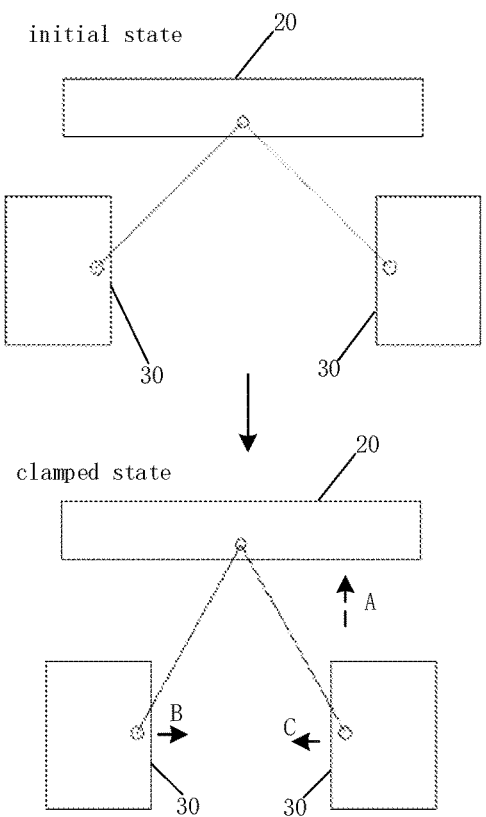
FIG. 2 is a schematic diagram of the movement states of the top sliding plate and the clamping plates according to an embodiment of the present application.

Taking a case in which the clamped piece is a mobile phone as an example, referring to FIGS. 1 and 2, the mobile phone laterally enters the accommodating space in the direction of the arrow A in FIG. 1. Firstly, a side wall of the mobile phone contacts the top sliding plate 20, which drives the top sliding plate 20 to move in the direction of the arrow A, wherein the direction of the arrow A is the first direction.

As shown in FIG. 2, in the initial state, the pair of clamping plates 30 have a large distance therebetween, and the top sliding plate 20 is relatively close to the pair of clamping plates 30. When the top sliding plate 20 is moving in the direction of the arrow A (the first direction), the top sliding plate 20 drives via the synchronizing bars 31 the pair of clamping plates 30 to move toward each other; in other words, the pair of clamping plates 30 move in the directions of the arrow B and the arrow C in FIG. 2 respectively, whereby the pair of clamping plates 30 clamp the mobile phone that is accommodated in the accommodating space, thereby realizing the purpose of clamping the mobile phone. Once the pair of clamping plates 30 have clamped the mobile phone, the main sliding plate 10, the top sliding plate 20, the clamping plates 30 and the mobile phone form an integral body. Subsequently, when the mobile phone is continuing to move in the direction of the arrow A, the mobile phone drives the top sliding plate 20, the top sliding plate 20 drives the clamping plates 30, and the clamping plates 30 drive the main sliding plate 10, to integrally move in the direction of the arrow A, till the top sliding plate 20 has been connected to the locking mechanism 40, and the locking mechanism 40 locks the current position of the top sliding plate 20. At this point, the process of clamping the mobile phone has completed.

When the mobile phone is to be released, the locking of the top sliding plate 20 by the locking mechanism 40 is released, and both of the main sliding plate 10 and the top sliding plate 20 will move in the direction opposite to the first direction, till they have restored to their original positions. When the top sliding plate 20 is restoring, the pair of clamping plates 30 move in the directions opposite to the arrow B and the arrow C respectively to their original positions.

The clamping device according to the embodiment of the present application will be described in further detail below.

Figure 3:
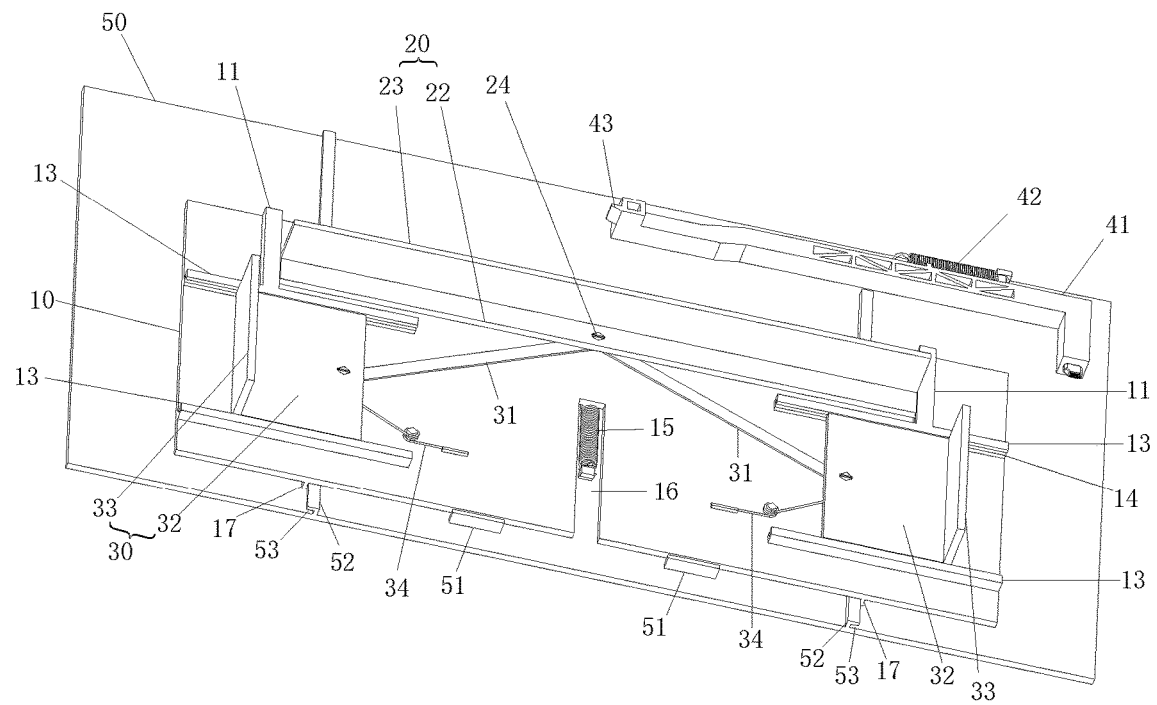
FIG. 3 is a schematic perspective structural diagram of the clamping device according to an embodiment of the present application.
Figure 4:
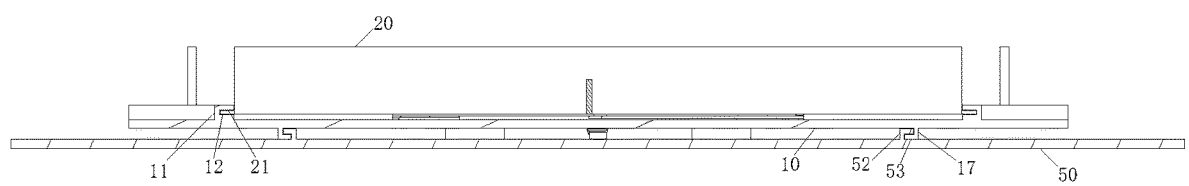
FIG. 4 is a schematic side structural diagram of the clamping device according to an embodiment of the present application.

In order to limit the direction of the movement of the top sliding plate 20, referring to FIGS. 1, 3 and 4, in an implementable embodiment of the present application, the main sliding plate 10 is provided with a first positioning block 11 at each of positions that correspond to the two opposite ends of the top sliding plate 20. A first slideway 12 that extends in a sliding direction of the top sliding plate 20 is provided on a side of the first positioning block 11 that faces the top sliding plate 20. A first sliding rail 21 that matches with the first slideway 12 is provided at a position of the top sliding plate 20 that corresponds to the first slideway 12, and the first sliding rail 21 is reciprocatingly movable in a direction of the extension of the first slideway 12. In an implementable embodiment, a groove that depresses away from the top sliding plate 20 is provided on a side of the first positioning block 11 that faces the top sliding plate 20, and the groove is the first slideway 12. The first slideway 12 on the first positioning block 11 limits the first sliding rail 21 to be merely able to move in the direction of extension of the first slideway 12, which prevents the first sliding rail 21 from displacing with respect to the main sliding plate 10 in other directions. Optionally, in order to prevent the first sliding rail 21 from, in the first slideway 12, moving out of the first slideway 12 in the direction opposite to the first direction, a limiting part is provided at one end of the first slideway 12 that is closer to the clamping plate 30, to prevent the first sliding rail 21 from moving out of the first slideway 12. Certainly, optionally, the first slideway 12 may also be provided on the top sliding plate 20, and the first sliding rail 21 be provided on the first positioning block 11.

Optionally, in an implementable embodiment of the present application, the top sliding plate 20 comprises a first bottom plate 22 and a first side plate 23 that is provided on the first bottom plate 22. The first bottom plate 22 is rotatably connected to one end of each of the synchronizing bars 31. The first sliding rails 21 are provided at the two opposite ends of the first bottom plate 22. After the clamped piece has entered the accommodating space, it abuts the first side plate 23, and drives via the first side plate 23 the top sliding plate 20 to move. The first bottom plate 22 is used for the connection with the synchronizing bars 31 and the first positioning blocks 11. In addition, in order to prevent the first side plate 23 from damaging the clamped piece when the first side plate 23 contacts the clamped piece, the first side plate 23 is provided with a first cushioning layer on the side contacting the clamped piece. The first cushioning layer has elasticity, and when the first side plate 23 is contacting the clamped piece, the first cushioning layer is deformed under the pressing, which offsets the acting force between the first side plate 23 and the clamped piece, to prevent the clamped piece from being damaged by the squeezing by the first side plate 23.

The first bottom plate 22 and the synchronizing bars 31 may be connected in many modes. In an implementable mode, referring to FIGS. 1 and 3, the first bottom plate 22 is provided with one rotation shaft 24, and the synchronizing bars 31 located on different clamping plates 30 are rotatably connected to the first bottom plate 22 via the rotation shaft 24. For example, the rotation shaft 24 is provided at the central position of the first bottom plate 22. When the top sliding plate 20 is moving in the first direction, the synchronizing bars 31 and the top sliding plate 20 rotate with respect to each other, and the synchronizing bars 31 and the clamping plates 30 also rotate with respect to each other. Simultaneously, the top sliding plate 20 drives the pair of clamping plates 30 to move toward each other. In such a mode, the synchronizing bars 31 are required to have a larger length, and the amplitude of the facing movement or opposite movement between the pair of clamping plates 30 is larger, which can enable the clamping mechanism to be suitable for clamped pieces of more specifications.

In another implementable mode, the first bottom plate 22 is provided with a plurality of rotation shafts 24, and the synchronizing bars 31 located on the different clamping plates 30 are rotatably connected to the first bottom plate 22 via different rotation shafts 24. For example, the rotation shafts 24 are two rotation shafts, and the two rotation shafts 24 are mirror-symmetrical relative to the center of the first bottom plate 22, wherein the rotation mode may refer to the above implementation mode. In such a mode, the synchronizing bars 31 are required to have a smaller length, which can effectively reduce the cost of the manufacturing of the synchronizing bars 31.

Optionally, in order to limit the direction of the movement of the clamping plates 30, referring continuously to FIGS. 1, 3 and 4, in an implementable embodiment of the present application, the main sliding plate 10 is provided with second positioning blocks 13 at the positions that correspond to the two opposite ends of each of the clamping plates 30. A second slideway 14 that extends in the sliding direction of a respective clamping plate 30 is provided on a side of each of the second positioning blocks 13 that faces the respective clamping plate 30. A second sliding rail that matches with a respective second slideway 14 is provided at a position of each of the clamping plates 30 that correspond to the respective second slideways 14, and the second sliding rail is reciprocatingly movable in a direction of extension of the respective second slideway 14. In an implementable embodiment, grooves that depress away from the clamping plate 30 are provided on the sides of the second positioning blocks 13 that face the clamping plate 30, and the grooves are the second slideways 14. The second slideways 14 on the second positioning blocks 13 limit the second sliding rails to be merely able to move in the direction of extension of the second slideways 14, which prevents the second sliding rails from displacing with respect to the main sliding plate 10 in other directions. Certainly, optionally, the second slideways 14 may also be provided on the clamping plate 30, and the second sliding rails be provided on the second positioning blocks 13.

Optionally, in order to prevent the first sliding rail 21 from, in the first slideway 12, moving out of the first slideway 12 in the direction opposite to the first direction, besides the limiting part, the second positioning blocks 13 can also prevent the first sliding rail 21 from moving out of the first slideway 12. Particularly, one of the second positioning blocks 13 that are located at the two opposite ends of the clamping plate 30 is connected to one end of the first positioning block 11 that is closer to the clamping plate 30, and extends beyond the first positioning block 11 and between the two first positioning blocks 11. The part of the second positioning blocks 13 that extend beyond the first positioning block 11 can limit the top sliding plate 20, to prevent the first sliding rail 21 from moving out of the first slideway 12 in the direction opposite to the first direction.

Optionally, in an implementable embodiment of the present application, each of the clamping plates 30 comprises a second bottom plate 32 and a second side plate 33 that is provided on the second bottom plate 32. The second bottom plate 32 is rotatably connected to one end of the synchronizing bar 31. The second sliding rails are provided at the two opposite ends of the second bottom plate 32. After the clamped piece has entered the accommodating space, the pair of clamping plates 30 clamp the clamped piece by using the second side plates 33. In order to prevent the second side plate 33 from damaging the clamped piece when the second side plate 33 contacts the clamped piece, the second side plate 33 is provided with a second cushioning layer on the side contacting the clamped piece. The second cushioning layer has elasticity, and when the second side plate 33 is contacting the clamped piece, the second cushioning layer is deformed under the pressing, which offsets the acting force between the second side plate 33 and the clamped piece, to prevent the clamped piece from being damaged by the squeezing by the second side plate 33. The second bottom plate 32 is used for the connection with the synchronizing bars 31 and the second positioning blocks 13. The mode of the connection between the second bottom plates 32 and the synchronizing bars 31 is that each of the second bottom plates 32 is connected to a respective synchronizing bar 31. After the second bottom plate 32 has been connected to the second slideways 14 on the second positioning blocks 13 via the second sliding rails, the second bottom plate 32 can serve to guide the clamping plate 30, to prevent the movement direction of the clamping plate 30 from being deviated, which results in that the force of the second side plates 33 clamping the clamped piece is deviated, and does not clamp the clamped piece firmly.

Referring continuously to FIGS. 1 and 3, optionally, in an implementable embodiment of the present application, the main sliding plate 10 is provided with a first elastic member 15. One end of the first elastic member 15 is fixed, and the other end is connected to the main sliding plate 10. The first elastic member 15 can, when the locking mechanism 40 has released the locking of the top sliding plate 20, automatically restore the main sliding plate 10 to its original position, which avoids the manual restoring by the user. Particularly, when the main sliding plate 10 is moving in the first direction, the first elastic member 15 provides a restoring force to the main sliding plate 10. After the locking mechanism 40 releases the locking of the top sliding plate 20, by the restoring force of the first elastic member 15, the main sliding plate 10 restores to its original position.

For example, the first elastic member 15 includes but is not limited to a tension spring, a pressure spring and an elastic sheet. Taking a case in which the first elastic member 15 is a tension spring as an example, after the top sliding plate 20 has driven the pair of clamping plates 30 to clamp the clamped piece that is accommodated in the accommodating space, when continuing to move in the first direction, the top sliding plate 20 drives the main sliding plate 10 to move in the first direction. At this point, the main sliding plate 10 pulls the tension spring, whereby the tension spring is deformed, to generate the restoring force. After the locking mechanism 40 has released the locking of the top sliding plate 20, the main sliding plate 10 moves in the direction opposite to the first direction under the restoring force of the tension spring, till it has restored to its original position.

Optionally, in order to prevent the first elastic member 15 from occupying additional space, in an implementable embodiment of the present application, the main sliding plate 10 is provided with an accommodating groove 16 that extends in the direction of the movement of the main sliding plate 10, and the first elastic member 15 is provided in the accommodating groove. The accommodating groove 16 extends in the direction of the movement of the main sliding plate 10, and the first elastic member 15 is deformed in the direction of extension of the accommodating groove 16, which does not occupy additional space, and makes the structure of the entire device more compact.

In order to further realize automatically restoring the top sliding plate 20 and the clamping plates 30 to their original positions when the locking mechanism 40 has released the locking of the top sliding plate 20, to avoid the manual restoring by the user, in an implementable embodiment of the present application, each clamping plate of the pair of clamping plates 30 is provided with a second elastic member 34. One end of the second elastic member 34 is fixed to the main sliding plate 10, and the other end is connected to the clamping plate 30. When the pair of clamping plates 30 are moving toward each other, the second elastic member 34 provides a restoring force to the clamping plate 30. After the locking mechanism 40 releases the locking of the top sliding plate 20, by the restoring force of the second elastic members 34, the pair of clamping plates 30 move oppositely to their original positions.

For example, the second elastic member 34 includes but is not limited to a tension spring, a pressure spring, an elastic sheet and a torsional spring. Taking a case in which the second elastic member 34 is a torsional spring as an example, the main sliding plate 10 is provided with a connecting pillar and a stopping block, the torsional spring is nested to the connecting pillar, one end of the torsional spring abuts the stopping block, and the other end is connected to the second bottom plate 32 of the clamping plate 30. When the top sliding plate 20 is moving in the first direction, the top sliding plate 20 drives via the synchronizing bars 31 the pair of clamping plates 30 to move toward each other. The clamping plate 30, when moving, is required to overcome the torsion of the torsional spring, to cause the torsional spring to deform, to generate the restoring force. After the locking mechanism 40 has released the locking of the top sliding plate 20, the pair of clamping plates 30 move away from each other under the restoring forces of the torsional springs, till they have restored to their original positions. When the pair of clamping plates 30 are moving away from each other, they drive the top sliding plate 20 to restore to their original position.

In order to further realize the integration of the clamping device, the clamping device further comprises a fixing plate 50. The main sliding plate 10 is slidably provided on the fixing plate 50. The locking mechanism 40 is provided on the fixing plate 50. The fixing plate 50 can integrate the components of the clamping device, which realizes the integration of the clamping device. Moreover, in order to prevent the main sliding plate 10 from sliding out of the fixing plate 50 when moving in the direction opposite to the first direction, the main sliding plate is provided with a stopper block 51, and the stopper block 51 is located in the path where the main sliding plate 10 moves in the direction opposite to the first direction, to limit the maximum distance of the movement of the main sliding plate.

In order to limit the direction of the movement of the main sliding plate 10, referring to FIGS. 1, 3 and 4, in an implementable embodiment of the present application, the fixing plate 50 is provided with a third positioning block 52 on a side facing the main sliding plate 10. A third slideway 53 that extends in a sliding direction of the main sliding plate 10 is provided on a side of the third positioning block 52 that faces the main sliding plate 10. A third sliding rail 17 that matches with the third slideway 53 is provided at a position of the main sliding plate 10 that corresponds to the third slideway 53, and the third sliding rail 17 is reciprocatingly movable in a direction of extension of the third slideways 14. In an implementable embodiment, a groove that depress away from the main sliding plate 10 is provided on the side of the third positioning block 52 that faces the main sliding plate 10, and the groove is the third slideway 53. The third rail comprises a connecting plate and a sliding plate, one end of the connecting plate is connected to the main sliding plate 10, the other end is connected to one end of the sliding plate, and the other end of the sliding plate extends toward the third slideway 53. After the sliding plate has protruded into the third slideway 53, the third slideway 53 limits the third sliding rail 17 to be merely able to move in the direction of extension of the third slideway 53, which prevents the first sliding rail 21 from displacing with respect to the main sliding plate 10 in other directions. Moreover, the stopper block 51 can prevent the third sliding rail 17 from, in the third slideway 53, moving out of the third slideway 53 in the direction opposite to the first direction, to limit the maximum distance of the movement of the main sliding plate. Certainly, optionally, the third slideway 53 may also be provided on the main sliding plate 10, and the third sliding rail be provided on the fixing plate 50.

Referring continuously to FIGS. 1 and 3, in an implementable embodiment of the present application, the locking mechanism 40 comprises a locking rod 41 and a third elastic member 42. The reciprocating movement of the locking rod 41 can realize the locking and unlocking of the main sliding plate 10. The third elastic member 42 can realize automatically locking the main sliding plate 10 and, after the locking of the main sliding plate 10 has been released, automatically restoring to its original position. Particularly, one end of the third elastic member 42 is fixed, and the other end is connected to the locking rod 41. The locking rod 41 is provided with a first clip part 43 at one end, and a second clip part 25 that matches with the first clip part 43 is provided at the position of the top sliding plate 20 that corresponds to the first clip part 43. The first clip part 43 and the second clip part 25 include but are not limited to a grabbing hook, wherein the bending directions of the hook of the first clip part 43 and the hook of the second clip part 25 are opposite.

For example, the third elastic member 42 includes but is not limited to a tension spring, a pressure spring and an elastic sheet. Taking a case in which the third elastic member 42 is a tension spring as an example, one end of the tension spring is fixedly connected to the fixing plate 50, and the other end is connected to the locking rod 41. The locking rod 41 may reciprocatingly move in the direction of the arrow D in FIG. 1. The top sliding plate 20 drives the main sliding plate 10 to move in the first direction, and when the second clip part 25 on the top sliding plate 20 contacts the first clip part 43, the second clip part 25 presses the first clip part 43, whereby the locking rod 41 moves in the direction of the arrow D, and the third elastic member 42 is deformed. When the second clip part 25 has extended beyond the first clip part 43, by the restoring force of the third elastic member 42, the locking rod 41 moves in the direction opposite to the arrow D, whereby the first clip part 43 and the second clip part 25 are clip-connected, to enable the locking rod 41 to lock the current position of the top sliding plate 20.

When the user is to release the locking of the top sliding plate 20, the locking rod 41 may be moved in the direction of the arrow D by an external force, to separate the second clip part 25 from the first clip part 43, whereby the locking rod 41 releases the locking of the top sliding plate 20. When the external force is removed, by the restoring force of the third elastic member 42, the locking rod 41 moves in the direction opposite to the arrow D, and restores to its original position.

The Second Embodiment

Correspondingly, an embodiment of the present application further provides a head-mounted apparatus, comprising the clamping device according to the first embodiment.

In the second embodiment of the present application, the clamping device may be used as a separate structure. For example, the mobile phone is inserted into the accommodating space, and then the clamping device is mounted into the head-mounted apparatus. The clamping device may also be provided in the head-mounted apparatus. In an implementable mode, the head-mounted apparatus comprises a housing, and the clamping device is provided in the housing. The housing is provided with an opening for entering and exiting of the clamped piece, and the clamping device is provided with a sensor for measuring a width at the opening, to measure the width of the clamped piece that enters and exits via the opening.

The particular implementation of the second embodiment may refer to the implementation of the first embodiment, and will not be discussed here further.

The head-mounted apparatus according to the embodiments of the present application includes but is not limited to a head-mounted VR (Virtual Reality) apparatus and a head-mounted AR (Augmented Reality) apparatus. As particular examples, the head-mounted apparatus according to the embodiments of the present application may have a width not greater than 220 mm, a thickness not greater than 130 mm and a height not greater than 170 mm. The direction parallel to the connecting line between the two eyes is the width direction, the horizontal vision direction is the thickness direction, and the vertical direction is the height direction.

In conclusion, in the technical solution according to the embodiments of the present application, when the top sliding plate is moving, it can drive via the synchronizing bars the pair of clamping plates to move toward each other, so that the pair of clamping plates can clamp the clamped piece, which can be suitable for many kinds of clamped pieces, to enable the pair of clamping plates to clamp the clamped piece that is accommodated in the accommodating space. Furthermore, simultaneously when the pair of clamping plates are synchronously moving, the top sliding plate drives the main sliding plate via the pair of clamping plates, to ensure that the clamped piece is clamped at the central position of the clamping device. The clamping process is simple and quick, and the usage is humanized, which improves the usage experience of the user.

It should be noted that, although the particular implementation of the present application are described in detail with reference to the drawings, the description should not be understood as limiting the protection scope of the present application. Various modifications and variations that a person skilled in the art can make within the scope described by the claims without paying creative work still fall within the protection scope of the present application.

The examples of the embodiments of the present application aim at concisely describing the technical characteristics of the embodiments of the present application, to enable a person skilled in the art to intuitively know the technical characteristics of the embodiments of the present application, and do not limit the embodiments of the present application.

The above-described device embodiments are merely illustrative, wherein the units that are described as separate components may or may not be physically separate, which a person skilled in the art can understand and implement without paying creative work.

The above description illustrates and describes some preferable embodiments of the present application. However, as stated above, it should be understood that the embodiments of the present application are not limited to the forms disclosed herein, and should not be deemed as the exclusion of other embodiments. Instead, the present application may be used for various other combinations, modifications and circumstances, and can be modified within the scope of the concept of the present application by employing the above teaching or the techniques and knowledge in the relevant fields. Moreover, any modification or variation made by a person skilled in the art does not depart from the spirit and the scope of the embodiments of the present application, and should fall within the protection scope of the appended claims of the embodiments of the present application.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A clamping device, wherein the clamping device comprises: a main sliding plate, a top sliding plate, at least one pair of clamping plates each of which has a synchronizing bar, and a locking mechanism;
the top sliding plate is movably connected to the main sliding plate;
the pair of clamping plates are movably connected to the main sliding plate, the pair of clamping plates and the top sliding plate form an accommodating space, one end of the synchronizing bar is rotatably connected to a respective clamping plate, and the other end is rotatably connected to the top sliding plate;
the locking mechanism is located in a movement path of the top sliding plate; and
when the top sliding plate is moving in a first direction, the top sliding plate drives via the synchronizing bars the pair of clamping plates to move toward each other, whereby the pair of clamping plates clamp a clamped piece that is accommodated in the accommodating space; and simultaneously, the top sliding plate drives via the pair of clamping plates the main sliding plate to move in the first direction, whereby the top sliding plate is connected to the locking mechanism, and the locking mechanism locks a current position of the top sliding plate.

2. The clamping device according to claim 1, wherein the main sliding plate is provided with a first positioning block at each of positions that correspond to two opposite ends of the top sliding plate;
a first slideway that extends in a sliding direction of the top sliding plate is provided on a side of the first positioning block that faces the top sliding plate; and
a first sliding rail that matches with the first slideway is provided at a position of the top sliding plate that corresponds to the first slideway, and the first sliding rail is reciprocatingly movable in a direction of extension of the first slideway.

3. The clamping device according to claim 2, wherein the top sliding plate comprises a first bottom plate and a first side plate that is provided on the first bottom plate;
the first bottom plate is rotatably connected to one end of each of the synchronizing bars; and
the first sliding rails are provided at two opposite ends of the first bottom plate.

4. The clamping device according to claim 3, wherein the first bottom plate is provided with one rotation shaft, and the synchronizing bars located on different clamping plates are rotatably connected to the first bottom plate via the rotation shaft; or,
the first bottom plate is provided with a plurality of rotation shafts, and the synchronizing bars located on the different clamping plates are rotatably connected to the first bottom plate via different rotation shafts.

5. The clamping device according to claim 1, wherein the main sliding plate is provided with second positioning blocks at positions that correspond to two opposite ends of each of the clamping plates;
a second slideway that extends in a sliding direction of a respective clamping plate is provided on a side of each of the second positioning blocks that faces the respective clamping plate; and
a second sliding rail that matches with a respective second slideway is provided at a position of each of the clamping plates that correspond to the respective second slideway, and the second sliding rail is reciprocatingly movable in a direction of extension of the respective second slideway.

6. The clamping device according to claim 5, wherein each of the clamping plates comprises a second bottom plate and a second side plate that is provided on the second bottom plate;
the second bottom plate is rotatably connected to one end of the synchronizing bar; and
the second sliding rails are provided at two opposite ends of the second bottom plate.

7. The clamping device according to claim 1, wherein the main sliding plate is provided with a first elastic member;
one end of the first elastic member is fixed, and the other end is connected to the main sliding plate;
when the main sliding plate is moving in the first direction, the first elastic member provides a restoring force to the main sliding plate; and
once the locking mechanism releases the locking of the top sliding plate, by the restoring force of the first elastic member, the main sliding plate restores to an original position.

8. The clamping device according to claim 7, wherein the main sliding plate is provided with an accommodating groove that extends in a direction of movement of the main sliding plate, and the first elastic member is provided in the accommodating groove.

9. The clamping device according to claim 1, wherein each clamping plate of the pair of clamping plates is provided with a second elastic member;
one end of the second elastic member is fixed to the main sliding plate, and the other end is connected to the clamping plate;
when the pair of clamping plates are moving toward each other, the second elastic member provides a restoring force to the clamping plate; and
once the locking mechanism releases the locking of the top sliding plate, by the restoring force of the second elastic member, the pair of clamping plates move away from each other to original positions.

10. The clamping device according to claim 1, wherein the clamping device further comprises a fixing plate;
the main sliding plate is slidably provided on the fixing plate;
the locking mechanism is provided on the fixing plate; and
the main sliding plate is provided with a stopper block, and the stopper block is located in a path where the main sliding plate moves in a direction opposite to the first direction, to limit a maximum distance of the movement of the main sliding plate.

11. The clamping device according to claim 10, wherein the fixing plate is provided with a third positioning block on a side facing the main sliding plate;
a third slideway that extends in a sliding direction of the main sliding plate is provided on a side of the third positioning block that faces the main sliding plate; and
a third sliding rail that matches with the third slideway is provided at a position of the main sliding plate that corresponds to the third slideway, and the third sliding rail is reciprocatingly movable in a direction of extension of the third slideway.

12. The clamping device according to claim 1, wherein the locking mechanism comprises a locking rod and a third elastic member;
one end of the third elastic member is fixed, and the other end is connected to the locking rod; and the locking rod is provided with a first clip part at one end, and a second clip part that matches with the first clip part is provided at a position of the top sliding plate that corresponds to the first clip part.

13. A head-mounted apparatus, wherein the head-mounted apparatus comprises: a clamping device, wherein the clamping device comprises: a main sliding plate, a top sliding plate, at least one pair of clamping plates each of which has a synchronizing bar, and a locking mechanism;

the top sliding plate is movably connected to the main sliding plate;

the pair of clamping plates are movably connected to the main sliding plate, the pair of clamping plates and the top sliding plate form an accommodating space, one end of the synchronizing bar is rotatably connected to a respective clamping plate, and the other end is rotatably connected to the top sliding plate;

the locking mechanism is located in a movement path of the top sliding plate; and when the top sliding plate is moving in a first direction, the top sliding plate drives via the synchronizing bars the pair of clamping plates to move toward each other, whereby the pair of clamping plates clamp a clamped piece that is accommodated in the accommodating space; and simultaneously, the top sliding plate drives via the pair of clamping plates the main sliding plate to move in the first direction, whereby the top sliding plate is connected to the locking mechanism, and the locking mechanism locks a current position of the top sliding plate.

* * * * *